US012570030B2

(12) United States Patent
Rossi et al.

(10) Patent No.: US 12,570,030 B2
(45) Date of Patent: Mar. 10, 2026

(54) INJECTOR BODY FOR INJECTION MOLDING

(71) Applicant: INGLASS S.P.A., San Polo di Piave (IT)

(72) Inventors: Massimo Rossi, San Polo di Piave (IT); Massimo De Nadai, San Polo di Piave (IT); Damiano Boz Jacob, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 89 days.

(21) Appl. No.: 18/628,737

(22) Filed: Apr. 7, 2024

(65) Prior Publication Data

US 2024/0351255 A1     Oct. 24, 2024

(30) Foreign Application Priority Data

Apr. 19, 2023     (IT) ......................... 102023000007599

(51) Int. Cl.
B29C 45/22     (2006.01)

(52) U.S. Cl.
CPC .................................... B29C 45/22 (2013.01)

(58) Field of Classification Search
CPC ................................ B29C 45/20; B29C 45/22
See application file for complete search history.

(56) References Cited

U.S. PATENT DOCUMENTS

| | | | | |
|---|---|---|---|---|
| 2,878,515 A | * | 3/1959 | Strauss | B29C 45/2806 |
| | | | | 425/566 |
| 3,512,216 A | * | 5/1970 | Voelker | B29C 33/0077 |
| | | | | 264/DIG. 83 |
| 3,758,252 A | * | 9/1973 | Kohler | B29C 45/22 |
| | | | | 425/570 |
| 3,806,295 A | * | 4/1974 | Gellert | B29C 45/281 |
| | | | | 425/563 |
| 4,121,740 A | * | 10/1978 | Gabrys | B29C 45/22 |
| | | | | 425/572 |

(Continued)

FOREIGN PATENT DOCUMENTS

| | | | |
|---|---|---|---|
| CN | 211730063 U | 10/2020 | |
| CN | 113021781 A * | 6/2021 | ......... B29C 45/2806 |

(Continued)

OTHER PUBLICATIONS

Machine translation of CN113021781A, 12 pages. (Year: 2025).*

(Continued)

*Primary Examiner* — Emmanuel S Luk

(74) *Attorney, Agent, or Firm* — Rivka Friedman

(57)     ABSTRACT

An injector body for injection molding is described mountable on a plate, wherein such injector body is formed of a first portion juxtaposed with a second portion, the first portion being elongated along an axis and provided internally with a first longitudinal channel to carry molten material to a nozzle located at the end of the first channel in correspondence of one end of the first portion, and the second portion being a radial widening of the first portion about said axis and internally provided with a second channel that crosses the thickness of the second portion and joins the first channel extending obliquely to said axis.

16 Claims, 3 Drawing Sheets

(56) References Cited

U.S. PATENT DOCUMENTS

| | | | | | |
|---|---|---|---|---|---|
| 4,380,426 | A | * | 4/1983 | Wiles | B29C 45/281 |
| | | | | | 425/566 |
| 4,433,969 | A | * | 2/1984 | Gellert | B23P 15/007 |
| | | | | | 425/549 |
| 4,468,191 | A | * | 8/1984 | Gellert | B29C 45/281 |
| | | | | | 425/572 |
| 5,378,138 | A | * | 1/1995 | Onuma | B29C 45/2806 |
| | | | | | 264/102 |
| 7,255,555 | B2 | * | 8/2007 | Babin | B29C 45/2725 |
| | | | | | 425/572 |
| 7,407,380 | B2 | * | 8/2008 | Tabassi | B29C 45/2806 |
| | | | | | 425/564 |
| 7,862,329 | B2 | * | 1/2011 | Martino | B29C 45/2806 |
| | | | | | 425/572 |
| 2009/0321994 | A1 | * | 12/2009 | Dal Bo | B29C 45/2806 |
| | | | | | 425/546 |
| 2011/0129561 | A1 | * | 6/2011 | Adas | B29C 45/2806 |
| | | | | | 425/564 |
| 2021/0268707 | A1 | * | 9/2021 | Ward | B29C 45/2708 |

FOREIGN PATENT DOCUMENTS

| | | | | |
|---|---|---|---|---|
| DE | 4034934 | C2 | | 3/1994 |
| EP | 2998094 | A2 | | 3/2016 |
| JP | 05177664 | A | * | 7/1993 |
| JP | 2000343560 | A | | 12/2000 |
| JP | 2002273768 | A | * | 9/2002 |

OTHER PUBLICATIONS

Google patents machine translation of JP2002273768A, 11 pages. (Year: 2025).*

Italian Search Report for IT 202300007599 Mailed on Nov. 22, 2023.

* cited by examiner

INJECTOR BODY FOR INJECTION MOLDING

TECHNICAL FIELD

The invention refers to an injector body for injection molding and related mounting assembly.

BACKGROUND

In injection molding systems the mold is made up of two sections, a section fixed to the press and a movable section, which are made up of multiple sandwich-arranged plates and rigidly fixed to each other. The hot runner is positioned inside the sandwich of plates of one section and rigidly blocked by them.

In special applications where it is essential to miniaturize the dimensions of the hot runner, its components are not fixed to each other but only positioned precisely. The hot runner is blocked by tightening the plates together.

The thrust of the plastic material into the mold frequently tends to detach the components thereof, in particular the body of the injector from the body of the cylinder and/or from the hot runner located immediately upstream. If this happens there is leakage of plastic material.

U.S. Pat. No. 5,013,235 addresses this issue. Here the counterpoised position of the injectors, arranged along the same axis passing through the shutter, however, determines a mold with significant bulk. The cylindrical body of the shutter 3 has bearing surfaces on a mold plate 5 which are symmetrical with respect to the axis. A body 7 is placed immediately in contact with the injector body, both having internal channels (see ref. 11) to bring the molten plastic material to a nozzle 2a. The body 7 sits on the mold plate 5 via a support element (visible in FIG. 1 of U.S. Pat. No. 5,013,235 as a knurled rectangle) installed in the empty compartments 13. A first disadvantage of such an element is that it must be calibrated several times during the start-up phase to avoid material losses (this involves multiple disassemblies of the mold). Furthermore, the support element lies on a surface of the plate 5 different from that of the injector body, requiring different and additional fine-tuning operations. The support element is positioned to support the body 7 in the zone where the plastic material present inside the channel 9, 11 exerts the maximum pressure (receiving end 10), with the risk of detaching the body 7 from the manifold 6. Furthermore, the channel 11 is shaped with three parts: the first one vertical and adjacent to the inlet 10, the second one transversal with a very flat angle (approximately) 20° and the third one almost vertical for entering the channel towards the gate. Their position, length and inclination determine the thickness of the body 7 and consequently the transversal dimensions of the mould.

SUMMARY

The main object of the invention, defined in the attached claims in which the dependent claims define advantageous variants, is to improve this state of the art.

Particular object is to improve the resistance of a mold to the force imparted to its components by the molten fluid material that flows internally thereinto.

Another particular object is to avoid leakage of the molten material between said components.

At least one object is achieved by an injector body for injection molding mountable/mounted on a plate and formed of a first portion juxtaposed with a second portion, wherein the first portion is elongated along an axis and internally provided with a first longitudinal (e.g. straight and coaxial) channel to bring molten material to a nozzle located at the end of the first channel in correspondence with one end of the first portion (the nozzle is facing a cavity of a mold), and the second portion is a radial widening of the first portion about said axis and is internally provided with a second channel which crosses the thickness of the second portion and joins the first channel (e.g. at the center of the first portion) extending obliquely with respect to said axis, wherein the second portion comprises a radial protuberance which extends radially from the axis beyond the second canal, and is concentrated around an imaginary straight line orthogonal to said axis and intersecting the second channel, the radial protuberance conferring to the second portion an overall shape that is polarly asymmetrical with respect to said axis.

This configuration improves the stability of the injector with respect to the pressure of the molten material.

The radial protuberance preferably incorporates the second channel, which generally receives molten plastic material from a manifold and conveys it into the first channel.

The radial protuberance allows the making of said second channel with fewer curves and a direction more inclined towards the horizontal.

The radial protuberance is applied directly on a plate and has the effect of guaranteeing greater resistance to the thrust of the plastic material arriving in the second channel because it opposes a force tending to tilt the injector.

In a mounting assembly, the second portion rests on a contact surface of a (e.g. underlying) plate.

To simplify the construction of the second portion and the mounting of the injector seating inside the mold plates, the radial protuberance preferably comprises a flat surface belonging to a flat surface of the second portion. More preferably the flat surface of the radial protuberance and the flat surface of the second portion are coplanar. Even more preferably the flat surface of the radial protuberance and the flat surface of the second portion constitute a flat contact surface of the second portion against a plate or a manifold, and for this purpose they lie on one same plane which is orthogonal to said axis and intersects the first or second channel and/or intersects the first portion; and/or lie on one same plane orthogonal to said axis and form a contact surface for the injector against at least one plate in a position diametrically opposite to the nozzle.

In a mounting assembly, said two flat surfaces rest on a contact surface of a plate.

In particular, the second portion is composed of a first part having polar symmetry around said axis, and a second part, which constitutes said radial protuberance and which is prominent and protrudes from the first part so as to confer upon the second portion overall polar asymmetry around said axis.

More specifically, the second part has volume concentrated only about an imaginary line that orthogonally intersects said axis and the second channel, said second part protruding radially with respect to said axis to determine an overall polar asymmetry of shape of the second portion with respect to said axis (for example, the prominent part protrudes with respect to the axis more than the outermost perimeter of the second portion).

Unlike the prior art, the second prominent part preferably has a geometry configured to rest on the same contact surface (of at least one plate) on which the first part rests, thus allowing a single machining on such plate and a single assembly tolerance. Preferably said contact surface is entirely contained in one plane.

Another advantage of the geometry according to the invention is that the complex and prolonged calibration phase necessary in the installation of U.S. Pat. No. 5,013, 235 is totally avoided.

In a preferred variant, the first portion has a volume which substantially exhibits polar symmetry with respect to said axis, e.g. it has a cylindrical volume hollow in the center.

In a preferred variant, the first part comprises or consists of a first volume which exhibits substantially polar symmetry with respect to said axis, and the second prominent part comprises or consists of a second volume which extends eccentrically from the first volume in a direction which is orthogonal (radial) and opposite to said axis.

In a preferred variant, the second channel extends exclusively inside the first part. In this case, in the mounting assembly the second portion is preferably mounted (e.g. below and) in contact with a support plate which is provided with a third feeding channel of plastic material, wherein the third channel extends for a stretch along a second axis preferably parallel and offset with respect to the axis of the injector and then deviates towards said axis of the injector to end in an outlet of the support plate, the second portion having a contact surface with the support plate located at a point opposite the nozzle, the contact surface having an inlet for the second channel aligned with the outlet of the third channel, and the second prominent part, or the radial protuberance, is aligned with the second axis.

This guarantees greater resistance to the thrust of the plastic material.

In another preferred variant, which offers good resistance to the thrust of the molten plastic material, the second channel extends inside the first and second parts. In this case, in the mounting assembly the second portion is preferably mounted (e.g. below and) in contact with a support plate provided with a third feeding channel of plastic material, wherein the third channel extends for a stretch along a second axis preferably parallel and offset with respect to the axis of the injector and then deviates towards said axis of the injector to end in an outlet of the support plate, the second part having a contact surface with the support plate located at a point opposite the nozzle, the contact surface having an inlet for the second channel aligned with the outlet of the third channel, and the second prominent part, or the radial protuberance, is aligned with the second axis.

Said support plate e.g. encloses the second portion on the opposite side to the first portion.

In a preferred variant, the second and third channels are constituted of a multiplicity of channels converging towards and inside the first channel, with the same functions.

In particular, said support plate comprises a cavity in which an actuator is installed for a valve pin adapted to regulate the flow of molten material coming out of said nozzle.

The first and second parts may be the union of separate parts, e.g. juxtaposed and coupled along a coupling surface, or be a single body.

Here for plate it is meant a plate that makes up the sandwich of the mold or of the hot runner.

BRIEF DESCRIPTION OF THE DRAWINGS

The advantages of the invention will be even clearer from the following description of a preferred injector, wherein.

DETAILED DESCRIPTION

In the figures equal elements are indicated by equal numbers, and in order not to crowd the drawings sometimes only some numbers are shown.

Figure 2:
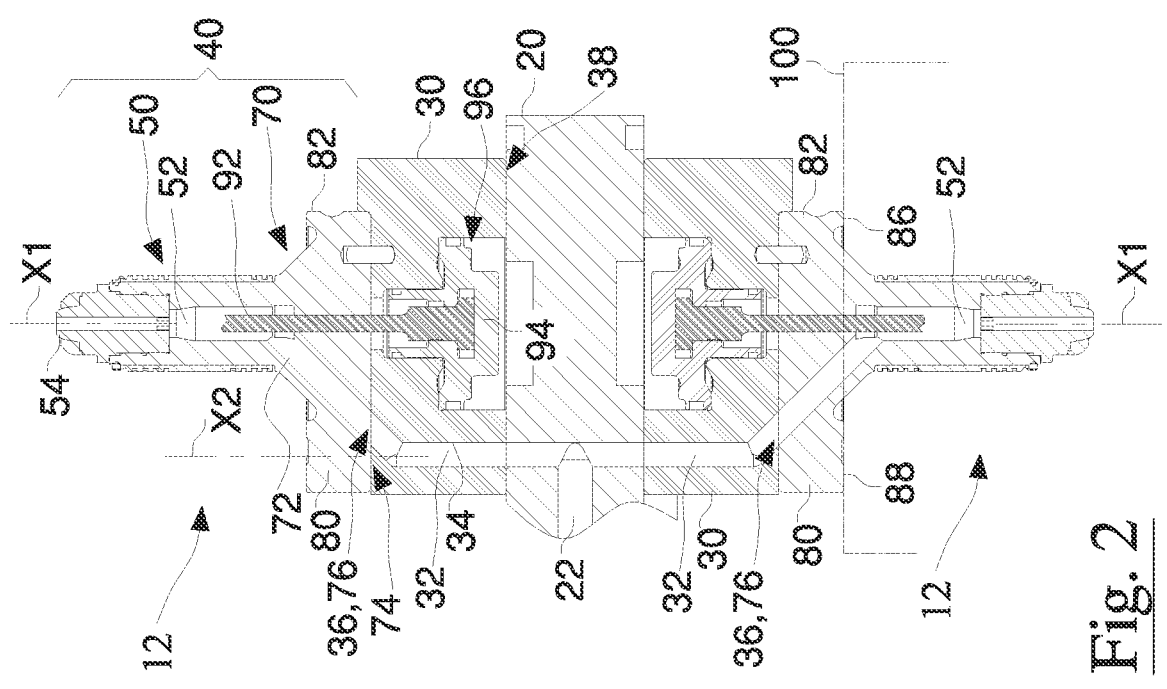
FIG. 2 shows a partial vertical cross-section of a pair of opposing injectors.
Figure 1:
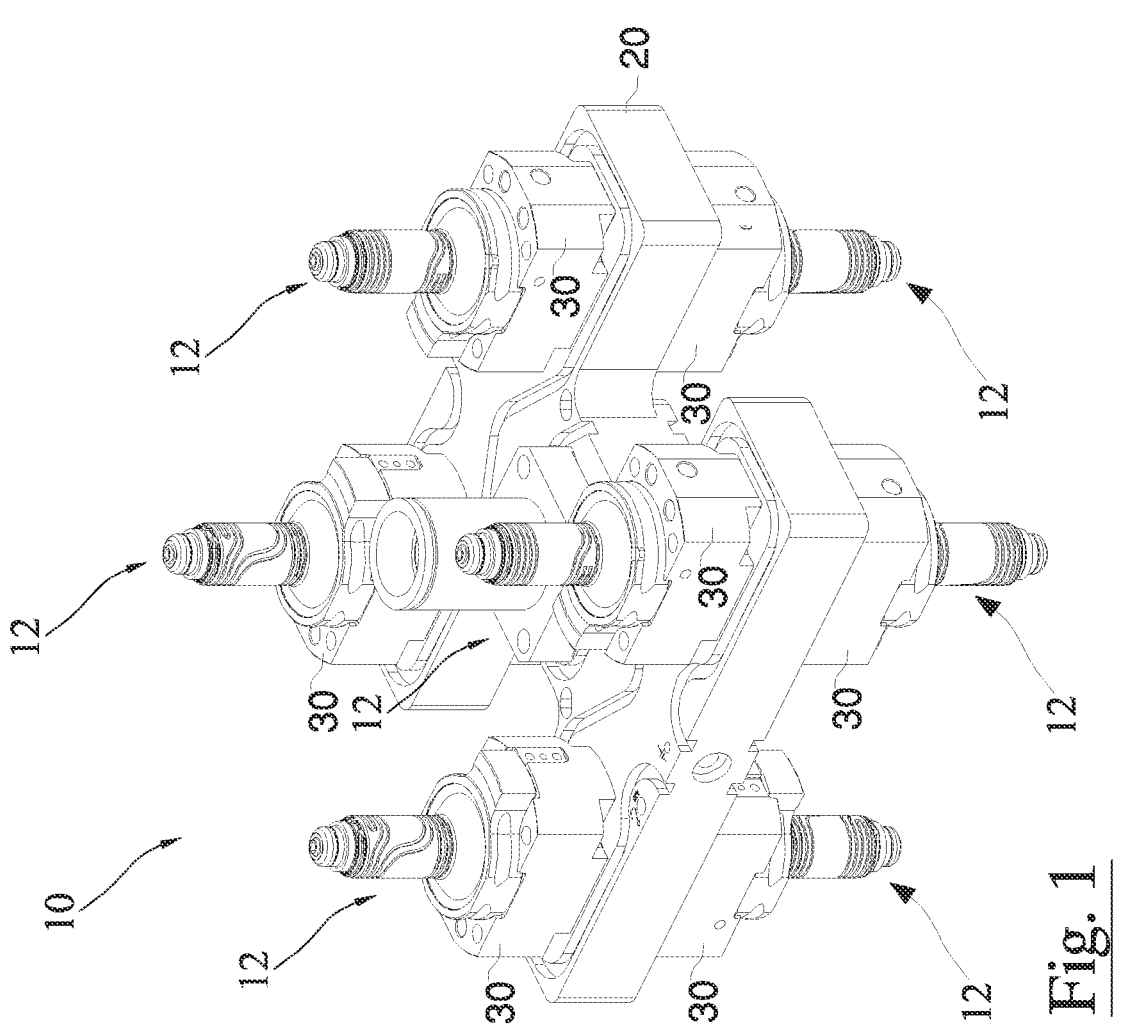
FIG. 1 shows a three-dimensional view of a hot runner formed of eight injectors.

FIG. 1 shows a hot runner 10 which integrates e.g. eight injectors 12 (e.g. four for each side), two of which are shown in cross-section in FIG. 2. For simplicity, only one injector 12 will be described, the others being the same.

A known manifold 20 feeds the injectors 12 by distributing molten material through one or more internal channels 22. On each opposite side of the manifold 20, four plates 30 are attached, and on the opposite side of each plate 30, on a contact surface 38 of the plate 30, an injector 12 is mounted. The injector 12 comprises a body 40 composed of a first portion 50 juxtaposed to a second portion 70. The two portions 50, 70 may be the union of two separate parts, e.g. juxtaposed and coupled along a coupling surface, or be integrated as a single piece in the body 40.

The first portion 50 is elongated along an axis X1 and is internally hollow to define a first channel 52 which is straight and adapted to bring molten material to a nozzle 54 located at the end of the channels 52. Preferably the channel 52 is located at the center of the first portion 50, coaxially to the X1 axis. The illustrated example shows a single channel 52, but there may be multiple channels 52 converging towards the nozzle 54.

The second portion 70 is a radial expansion of the first portion 50 around the X1 axis and is internally provided with a second channel 72 which passes through its thickness to join to the first channel 52 by extending, inside a plane passing through the X1 axis, obliquely to the X1 axis. The illustrated example shows only a second channel 72, but there may be multiple channels 72 converging towards the first channel 52.

The second portion 70 is provided with a contact surface 74, located on one side of the injector 12 opposite the nozzle 54, through which it can preferably be leant, pushed or attached to the plate 30. The contact surface 74 has an inlet 76 for the second channel 72. In turn, the plate 30 is provided with a supply channel 32 (could be multiple) extending along a X2 axis parallel and offset with respect to the X1 axis for a (e.g. straight) stretch 34 and then deviates towards the X1 axis to end at an outlet 36 which is aligned and mating with the inlet 76. The channel 32 is fed by the common channel 22 of the manifold 20.

According to a general scheme of injector (see FIG. 3) the second portion 70 is composed of a part 82 having a shape substantially provided with polar symmetry with respect to the X1 axis, and a prominent part 80, of any shape.

The part 80 projects from the part 82 radially with respect to the X1 axis and in a polarly asymmetric manner with respect to the X1 axis. Relative to the X1 axis, the part 80 extends radially further towards the outside than the channel 72. Then, due to the effect of the prominent part 80, the second portion 70 overall has a polarly asymmetric shape with respect to the X1 axis.

The part 82 may or may not be polarly symmetrical about the X1 axis. It is sufficient that the second portion 70 overall has a peripheral extension which extends away from the X1 axis along a straight line R (dashed in FIG. 3) orthogonal to the X1 axis and intersecting the channel 72.

Preferably the part 82 has a flat surface 81 belonging to a flat surface 71 of the second portion, and the two surfaces 71, 81 extend in planes orthogonal to the X1 axis. More preferably, the flat surface 81 and the flat surface 71 are coplanar, to simplify the construction and the coupling to the plate 30.

Figure 3:
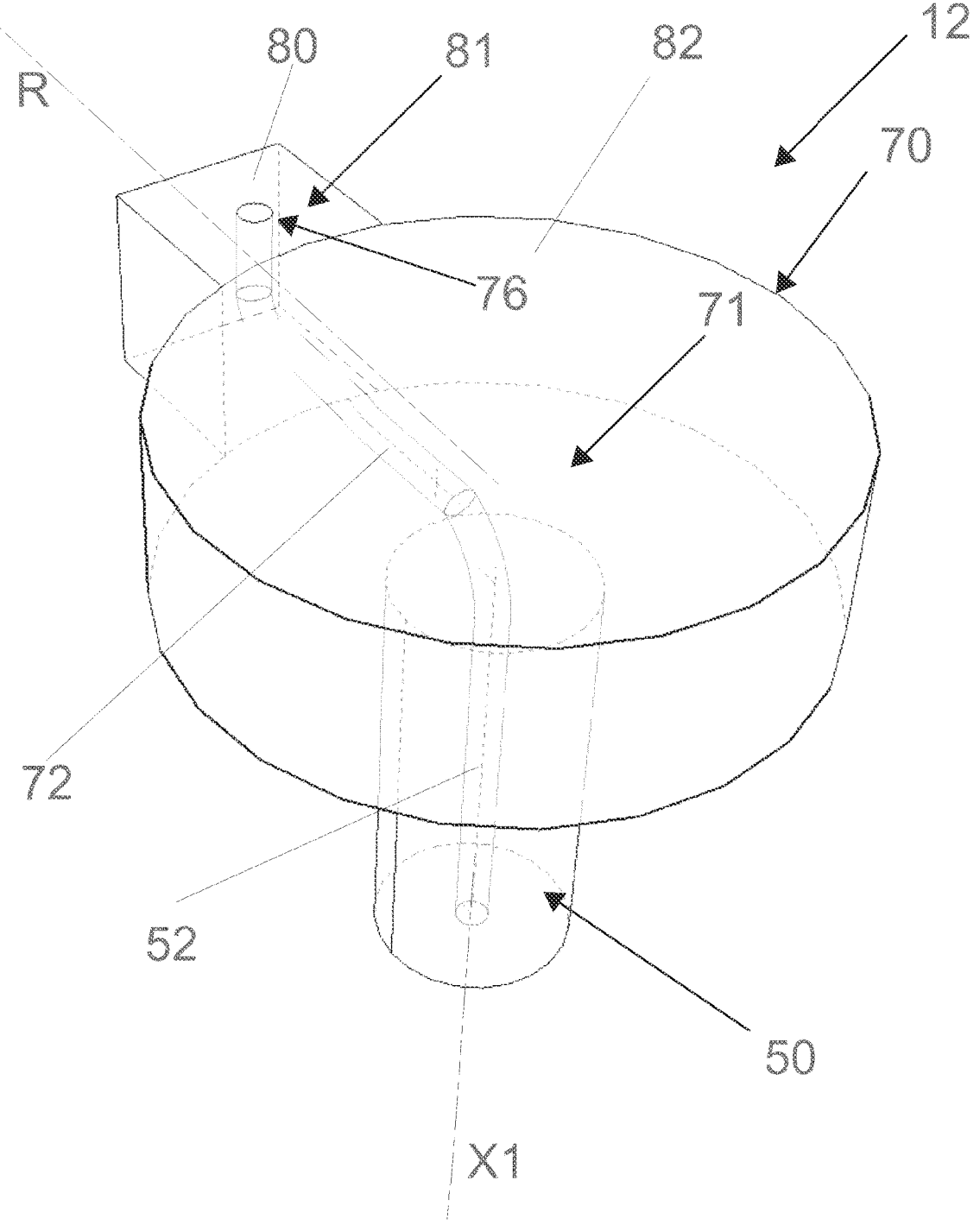
FIG. 3 shows a general geometric scheme for an injector body.
Figure 4:
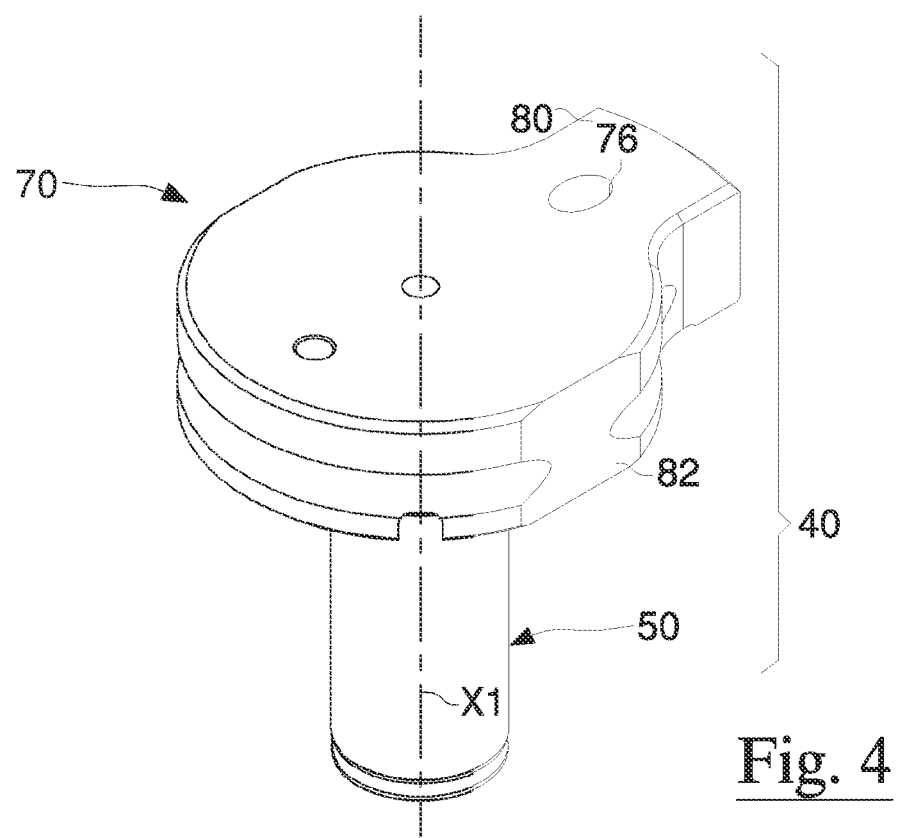
FIG. 4-5 show three-dimensional views of an injector body.

Also refer to the details of FIGS. 3-4.

As can also be seen from FIG. 2, both the symmetrical part 82 and the prominent part 80 (i.e. the entire second portion 70) are both configured to rest on the contact surface 74, which is preferably flat. Furthermore, the prominent part 80 is arranged to intersect the X2 axis.

The overall polarly asymmetric geometry of the second portion 70 guarantees greater tightness of the hot runner because the prominent part 80 opposes a force generated by the molten material directed along the X2 axis and tending to separate the second portion 70 from the plate 30.

Unlike U.S. Pat. No. 5,013,235, the body 40 is shaped to rest on the contact surface 74 via the prominent part 80 and the symmetrical part 82, thus allowing a single machining on the plate 30 and a single assembly tolerance.

Figure 5:
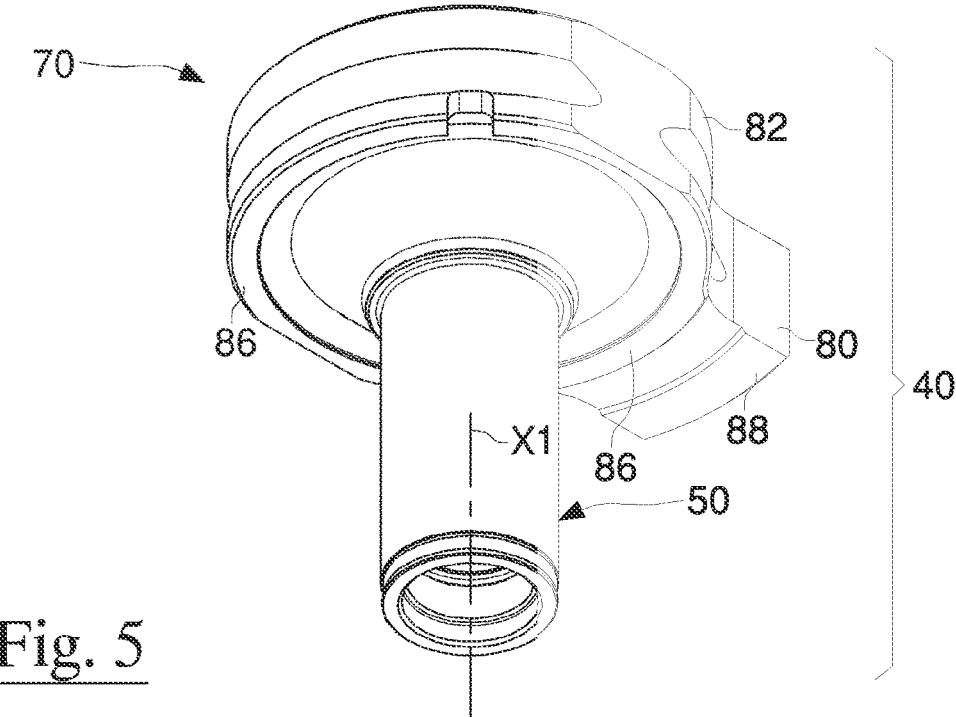

Advantageously, in an opposite position to the surfaces 80, 82 there are further provided flat surfaces 86, 88 respectively (see FIG. 5) which will be used as support against a plate of the mold 100 (dotted in FIG. 2). Said support allows the closing, with appropriate tightening screws, of the hot runner inside the sandwich mold. In particular, the surface 86 is substantially a ring, and/or the surface 88 is rectangular or an arc of circular crown.

In a preferred variant, the first portion 50 has a volume which exhibits essentially polar symmetry about the X1 axis, e.g. it has a cylindrical volume hollow at its center.

In a preferred variant, the second channel 72 extends exclusively inside the symmetrical part 82, but not necessarily.

In particular, the plate 30 comprises a cavity 96 in which a known actuator 94 is installed for at least one known valve pin 92 slidable inside the channel 52 for adjusting the flow coming out of the nozzle 54.

The symmetrical part 82 and the prominent part 80 may be two separate pieces and joined mechanically, or a single piece.

The invention is also applicable to an isolated injector, not necessarily to a group like the hot runner 10.

The invention claimed is:

1. Injection molding injector body mountable on a plate and formed of a first portion juxtaposed with a second portion, wherein the first portion is elongated along an axis and provided internally with a first longitudinal channel to carry molten material to a nozzle located at the end of the first channel in correspondence of one end of the first portion, and the second portion is a radial widening of the first portion about said axis and is internally provided with a second channel that crosses the thickness of the second portion and joins the first channel extending obliquely to said axis, wherein the second portion comprises a radial protuberance that extends radially from the axis beyond the second channel, and is centered around an imaginary straight line orthogonal to said axis and intersecting the second channel, the radial protuberance conferring to the second portion an overall shape that is polarly asymmetrical with respect to said axis.

2. Injector body according to claim 1, wherein the radial protuberance comprises a flat surface belonging to a flat surface of the second portion.

3. Injector body according to claim 2, wherein the flat surface of the radial protuberance and the flat surface of the second portion are coplanar.

4. Injector body according to claim 3, wherein the flat surface of the radial protuberance and the flat surface of the second portion constitute a flat contact surface of the second portion against a mold plate or manifold, and they lie on one same plane which is orthogonal to said axis and intersects the first or second channel and/or intersects the first portion.

5. Injector body according to claim 3, wherein the flat surface of the radial protuberance and the flat surface of the second portion form a flat contact surface of the second portion against a mold plate or a manifold, and they lie on one same plane orthogonal to said axis and form a contact surface for the injector located at a position diametrically opposite to the nozzle.

6. Injector body according to claim 1, wherein the second portion is composed of a first part having polar symmetry about said axis, and a second part constituting said radial protuberance and which is prominent and protruding from the first part so as to give overall polar asymmetry about said axis to the second portion.

7. Injector body according to claim 6, wherein the second part has volume concentrated only about an imaginary line orthogonally intersecting said axis and said second channel, said second part protruding radially with respect to said axis to determine an overall polar asymmetry of shape of the second part with respect to said axis.

8. Injector body according to claim 7, wherein the first part comprises or consists of a first volume exhibiting substantially polar symmetry with respect to said axis, and the second prominent part comprises or consists of a second volume extending eccentrically from the first volume in a direction which is radial, orthogonal and opposite to said axis.

9. Injector body according to claim 6, wherein the second channel extends exclusively inside the first part.

10. Injector body according to claim 6, wherein the second channel extends inside the first and second parts.

11. Injector body according to claim 1, wherein the second channel joins the first channel at the center of the first portion.

12. Injector body according to claim 6, wherein the second channel joins the first channel at the center of the first portion.

13. Injector body according to claim 1, wherein the first portion has a cylindrical volume hollow in the center which substantially exhibits polar symmetry with respect to said axis.

14. Injector body according to claim 6, wherein the first portion has a cylindrical volume hollow in the center which substantially exhibits polar symmetry with respect to said axis.

15. Injector body according to claim 1, wherein the first and second parts are a single body.

16. Injector body according to claim 6, wherein the first and second parts are a single body.

\* \* \* \* \*